(12) United States Patent
Snow et al.

(10) Patent No.: US 9,477,927 B2
(45) Date of Patent: Oct. 25, 2016

(54) AUTOMATIC TEST GENERATION FOR DECISION TABLE BASED RULES

(71) Applicants: Paul Snow, Austin, TX (US); Bhushan Naniwadekar, Austin, TX (US)

(72) Inventors: Paul Snow, Austin, TX (US); Bhushan Naniwadekar, Austin, TX (US)

(73) Assignee: SOURCEPULSE LLC, Austin, TX (US)

( * ) Notice: Subject to any disclaimer, the term of this patent is extended or adjusted under 35 U.S.C. 154(b) by 243 days.

(21) Appl. No.: 14/058,269

(22) Filed: Oct. 20, 2013

(65) Prior Publication Data

US 2014/0143198 A1    May 22, 2014

Related U.S. Application Data

(60) Provisional application No. 61/716,516, filed on Oct. 20, 2012.

(51) Int. Cl.
  *G06N 5/00*    (2006.01)
  *G06Q 10/04*    (2012.01)

(52) U.S. Cl.
  CPC .............. *G06N 5/006* (2013.01); *G06Q 10/04* (2013.01)

(58) Field of Classification Search
  CPC ..................................................... G06N 5/003
  See application file for complete search history.

(56) References Cited

U.S. PATENT DOCUMENTS

| | | | | |
|---|---|---|---|---|
| 2003/0101152 | A1* | 5/2003 | Hicks | G06N 5/022 706/45 |
| 2008/0196002 | A1* | 8/2008 | Koster | G06N 5/022 717/106 |
| 2009/0138415 | A1* | 5/2009 | Lancaster | G06N 5/04 706/11 |
| 2010/0175052 | A1* | 7/2010 | Prasad | G06F 11/3684 717/128 |
| 2012/0158628 | A1* | 6/2012 | Junker | G06F 19/00 706/14 |

* cited by examiner

*Primary Examiner* — Alan Chen
(74) *Attorney, Agent, or Firm* — Cesari & Reed LLP; Kirk A. Cesari; Christian W. Best

(57) ABSTRACT

Systems and methods are disclosed for testing decision table-based rules. In an embodiment, a memory device may store instructions that cause a processor to perform a method comprising receiving one or more constraints for a set of data attributes, generating a structured data set of the data attributes having values based on the one or more constraints, and providing the structured data set to a decision table-based rule set.

19 Claims, 4 Drawing Sheets

| entity | attribute | type | subtype | comment | Test Generation |
|---|---|---|---|---|---|
| request | books | array | | This is the list of books in this test case | use a new book entity from 5 to 6 times |
| request | publishers | array | | This is the list of publishers for the books in this test case | use a new publisher entity from 2 to 5 times |
| request | customer | entity | | This is the customer making the request | use a new customer entity |
| request | book | entity | | This is the current book | use a new book entity ; Add the book to the books. |
| request | access | string | | This is what the customer wants to do | |
| request | allow | boolean | | Allow the requested Access | |
| request | page_number | integer | | The page the user wishes to view | Use next_page |
| request | current_date | date | | The current date | Use from 1 to ( the book's number of pages * 2/3 ) Use a date between 01/01/2010 and 12/31/2015 |
| customer | open_books | array | book_access | Books the Customer is accessing | use a new open_book entity for all request books |
| customer | notes | array | | Tracking for decisions made about the customer | |
| book | publisher | entity | | This book's publisher | Use one of the request.publishers |
| book | chapters | array | | The chapters in the book | use a new chapter entity from 2 to 5 times |
| book | excluded_chapters | array | | The chapters that cannot be viewed in preview | Use the last 50 percent of the chapters |
| book | day_limit | integer | | Limit on the number of days one can preview, Zero is no limit | Use one of 0, 30, 60, 90, or 120 |
| book | number_of_pages | integer | | | start at 0 |
| open_book | begin_date | date | | Date access to this book was granted to the customer | Use a date between current_date - 3 months and the current_date |

FIG. 2a

| Entity | Attribute | Type | SubType | Comment | Test Generation |
|---|---|---|---|---|---|
| open_book | count_of_pages_read | integer | | (Used by test generation) percentage of the book read | use a number between 0 and (number_of_pages / 3 ) |
| open_book | pages | array | | List of pages viewed (by number) | Use a new page entity the count_of_pages_read times |
| open_book | chapters_viewed | array | | The chapters the customer has accessed | Use all chapters where there is a page where the page.number is between [ begin_page, the end_page ] |
| open_book | book | entity | | The book the customer is previewing | Use book.book |
| open_book | current_page | integer | | | start at 0 |
| chapter | begin_page | integer | | First page of the chapter | Use the book.number_of_pages +1 |
| chapter | end_page | integer | | Last page of the chapter | Use the book.number_of_pages + chapter.number_of_pages; Add the chapter.number_of_pages to the Book.number_of_pages; |
| chapter | number_of_pages | integer | | Number of pages in the chapter | Use a number between 10 and 30 |
| page | number | integer | | Page Number | Use the open_book.current_page +1; Add 1 to the open_book.current_page |
| publisher | chapter_limit | double | | Number of chapters the customer is allowed to view. 0 is no limit. | Use from 10.0% up to 80% |
| publisher | page_limit | double | | Number of pages the customer is allowed to view. 0 is no limit. | Use from 10.0% up to 80% |
| constants | Purchase | String | | | |
| constants | Preview | String | | | |
| constants | Next_Page | String | | | |

FIG. 2b

AUTOMATIC TEST GENERATION FOR DECISION TABLE BASED RULES

CROSS REFERENCE TO RELATED APPLICATIONS

The present application claims priority to U.S. provisional patent application Ser. No. 61/716,516, filed Oct. 20, 2012, entitled "Automatic Test Generation for Decision Table based Rules", the contents of which are hereby incorporated by reference in their entirety.

BACKGROUND

This disclosure relates to decision table based rule sets, and particularly to testing methods for decision table based rules.

SUMMARY

In an embodiment, a memory device may store instructions that cause a processor to perform a method comprising receiving one or more constraints for a set of data attributes, generating a structured data set of the data attributes having values based on the one or more constraints, and providing the structured data set to a decision table-based rule set.

BRIEF DESCRIPTION OF THE DRAWINGS

FIGS. 2a and 2b are tables of another illustrative embodiment of a system for automatic test generation for decision table based rules.

DETAILED DESCRIPTION

Figure 1:
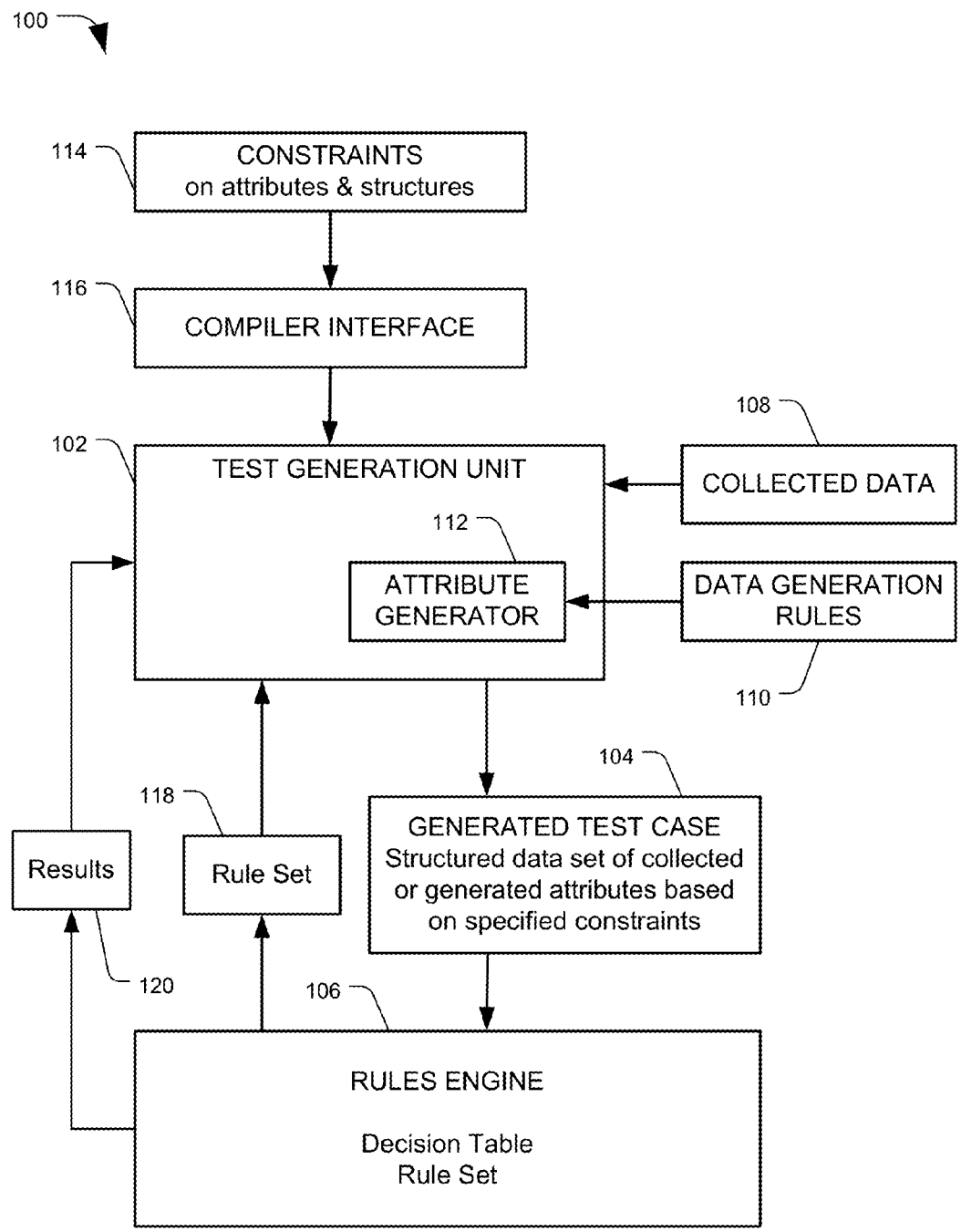
FIG. 1 is a diagram of an illustrative embodiment of a system for automatic test generation for decision table based rules.

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure. It is also to be understood that features of the various embodiments can be combined, separated, exchanged, or removed without departing from the scope of the present disclosure.

Rules engines, such as for executing business rules or other rule-based processes, may be constructed using decision tables. Decision Tables can come in many forms, but almost all of them consume structured data. Structured Data can be viewed as a set of tables and columns in a database, or a set of data structures in a modern programming language such as C, C++, Java, C#, COBOL, etc. Such data structures and relational databases can group related information together. In an example embodiment, a database may store records for numerous clients, and a group of related fields for each "client" may include a name, address, birth date, etc.

For example, these data structures can represent Cases with Clients who have various incomes. A Case can have a mailing address and a physical address. Clients could be enrolled in a number of programs. Clients might have been reported for an infraction against the rules of a program. Each of these things (i.e. Case, Client, addresses, programs, infractions, etc.) can be represented as a structure with a set of attributes, both calculated (per a set of rules) and collected.

For another example, an Income Tax form can be represented by a set of forms (1040, 1040 Schedule A, 1040 Schedule B, W-2, TD F 90-22.1, 1099, etc.). Each form can have a set of attributes, both calculated (per a set of rules) and collected. For example, collected data may include a reported gross income, while calculated data may include the adjusted gross income based upon the reported gross income along with appropriate financial deductions and other factors.

A rule set of a rules engine may have a multitude of branching decision points, based on the values of structured data fields used as input to the rules engine. Complex rule sets may have hundreds or thousands of potential decision points or outcomes, each of which may desirably be tested to ensure proper functioning of the rule set. In some instances, each decision point or outcome should be tested multiple times with a variety of data field values. An automatic test generation system can be used to create a set of test cases to test a rule set for proper functionality. Test cases may include a plurality of attributes and structures, the values of which need to be defined in order to test the many paths through a rule set.

Accordingly, constraints on the type or range of data permissible for each attribute or structure may be set. The constraints on each attribute and structure may be defined, such as by a user, using "natural language" syntax, e.g. very English-like statements, using programming language syntax, or any combination thereof. The language used can be extended in ways that allows nearly unlimited flexibility. For example, an interface to a compiler may be used to translate input into the appropriate compiler language. The compiler or interface may be user-provided, part of the automatic test generation system, or otherwise provided. The translation interface can allow constraints to be expressed in anything from a very Java-like syntax, to a very English-like syntax. The constraints can be augmented with some process rules (for setting up collections of structured data, relationships between structured data, etc.).

As discussed, the automatic test generation system can build a set of data to be provided to a rule set of a rules engine. The test cases can be populated with collected data (e.g. actual customer names, addresses, etc. collected from a source), originally generated (e.g. randomly generated values, or data picked from a fabricated collection of possible values for each data field), or any combination thereof. The generated test set of data can be edited. The rules can be referenced to guide the resolution of constraints in order to trigger particular paths. When using the rules to guide constraint resolution, the paths through the rules chosen can be specified manually or automatically. For example, the automatic test generation system can be configured to automatically generate a set of data which will test all or a subset of paths through a rule set, a particular path or paths may be specifically selected by a user, or a combination thereof.

The generation of a test case may involve constructing a set of structures such that the structures and their attributes represent a possible input to a set of rules. To do so, a set of cascading constraints on the attributes may be set. The automatic test generation system can walk through these constraints and select values that meet the criteria. Further, since the rules can be in Decision Table format, the test generation system can walk through the rules, resolving constraints such that particular paths through the rules are taken. As stated, these paths can be chosen manually, or automatically.

Generated tests can provide a number of uses. A set of generated tests can allow a rules editor to quickly build a set of tests to run against a rule set under development. A generated test can be the starting point for building a test that targets a particular set of rules. Since much of a test may be tedious to build manually, flushing out most of the details automatically can save a large amount of time. A set of generated tests can provide a potentially large and diverse set of data against which the performance of a rule set can be measured.

In an example embodiment, a rules engine may require testing. The rules engine can operate based on a decision table configured based on a rule set. The decision table may operate as a branching decision tree, with different paths through the tree taken based on the values of attributes in structured data sets provided to the rules engine as inputs. For example, a customer living in Vermont may result in a first set of options, while a customer living in California may result in a second set of options. Complex rule sets may result in many potential paths through the decision tree for testing.

Turning now to FIG. 1, a diagram of an illustrative embodiment of a system for automatic test generation for decision table based rules is depicted and generally designated 100. In order to test the rules engine, a test generation unit (TGU) 102 may be employed. The TGU 102 may be designed to output test cases 104 of structured data to the rules engine 106 to test the functionality of the rules engine 106 or various paths through the rules engine decision trees. The structured data sets may be populated with collected data 108, such as from a database, as well as calculated or generated data. For example, some attributes in a structured data set may have a value range, such as between 0 and 200. A set of data generation rules 110 defining these ranges for the attributes can be provided to an attribute generating node 112 of the test generation unit 102, allowing the TGU 102 to generate random or specific attributes within the appropriate range for use in a generated test case. Other attributes may be populated based data selected from a provided collected data set 108.

In some examples, the TGU 102 could be employed for boundary-testing, such as using values at the extreme limits of a value range, or just inside or outside of the appropriate value range, to determine how a rules engine will respond to extreme or potentially unacceptable inputs. The attribute generation node 112 may be configured to automatically generate boundary-testing data based on specified value ranges.

The TGU may use specified constraints 114 in order to select or generate data with which to populate a generated test case 104. For example, if a user wishes to test certain paths or attribute values in the rules engine 106, the user may specify constraints 114 to use the appropriate attribute values or follow a certain path. Constraints 114 may be entered through a compiler interface 116 that interprets the constraints 114 and transforms them into code or instructions for the TGU 102. The compiler interface 116 may allow for low-level instructions similar to computer instructions, or high-level instructions as with natural language processing. In some examples, specified constraints 114 may be broad, such as testing every path once, or they may be specific such as testing a specific path, or testing all potential paths for clients living in California.

Constraints 114 entered by a user can be augmented or implemented using addition information available to the TGU 102. For example, the TGU 102 can also reference the rule set 118 from the rules engine 106 in order to determine constraints necessary to trigger a particular path. A user may also be provided access to the rules set 118. Paths through the rules can be selected manually or automatically. In an illustrative embodiment, a user may specify that all paths of the rules engine 106 should be tested. The TGU 102 may consult the rule set 118 to determine triggering values for decision points, and generate a test case 104 using appropriate collected data 108 or data generation rules 110 to trigger all decision points.

On some embodiments, the results 120 of a given generated test case 104 or set of test cases can be returned to the TGU 102 and used to formulate additional test cases. For example, a broad set of constraints 114 may result in a large number of test cases 104. If some of the test cases 104 result in unexpected or improper outputs, the TGU 102 may formulate additional test cases 104 to further test specific paths that may be the cause of the unexpected or improper outputs.

FIGS. 2a and 2b are tables of another illustrative embodiment of a system for automatic test generation for decision table based rules. In particular, the table depicts an example test generation specification, including various attribute fields and data entity types. The example may be directed towards a rule set for a book-borrowing system. In the depicted example, a set of data entities are shown, with each entity having a number of attributes which comprise the entity. So a "book" entity may have attribute fields for a publisher, chapters, excluded chapters, a day limit, and a number of pages. Attributes may be different types of data structures. For example, the "chapters" attribute may be an array containing a listing of the chapters in the book, the "day limit" attribute may itself be a simple integer value, and the "publisher" attribute may be another entity with its own set of attributes. The attributes may further have sub-types. The comment field may describe what information each attribute covers or is directed to.

The Test Generation field may include data generation rules, constraints, or with what data the attributes should be populated. For example, the "request" entity may cover a test case, with the Test Generation field indicating how the attributes for the "request" entity should be populated. This may cause a test generating system to go down the list and create test entities.

For example, a test generation system may reach the "books" attribute of the request entity, and see that it should fill the books array with five or six new "book" entities. For each book entity, the test generation system may then create the proper "book" entity attributes. For example, it may create a "chapters" array, and populate with the two to five "chapter" entities as defined within the specification. For the chapter entity's "number of pages" attribute, the test generation system may generate a random number between 10 and 30, as described in the test generation field. Other attributes are provided with different equations, or references to other attributes that should be used to populate the field. These might include directions to pull a number of records from a database of collected data, for example.

A test generation specification can be entered into an automatic test generation system through an interface as a set of constraints. The system can interpret these constraints into an appropriate compiler code or computer language. The system can then use the supplied constraints to generate a set of test cases to test a decision table-based rules engine.

The generated test cases can be run through the rules engine, and the results can be analyzed, for example for the purposes of bug testing, tolerance testing, error handling, or other purposes. Creating a test generation specification can be faster than manually generating test cases, and can be less prone to error and omission.

Figure 3:
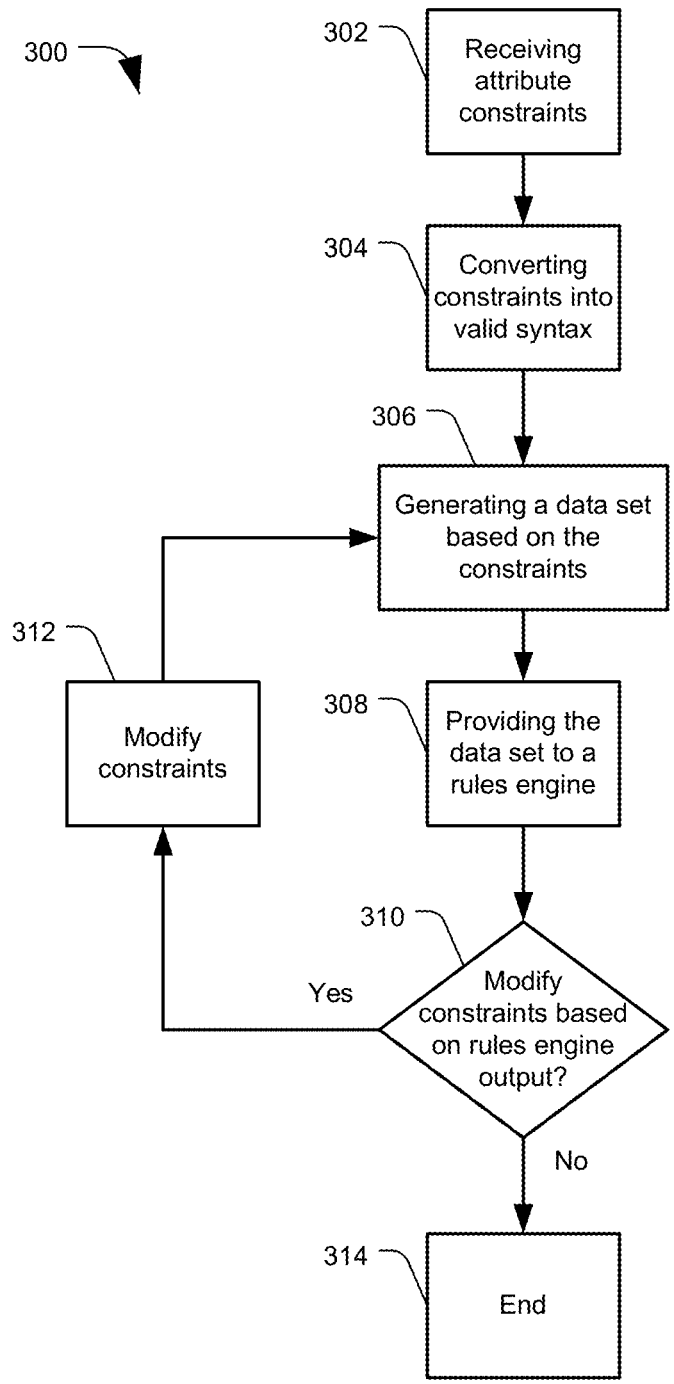
FIG. 3 is a flowchart of a method of an illustrative embodiment of a system for automatic test generation for decision table based rules.

FIG. 3 depicts a flowchart of a method of an illustrative embodiment of a system for automatic test generation for decision table based rules, generally designated 300. The method 300 may include receiving a set of attribute constraints, at 302. For example, this may be in the form of a test generation specification as shown in FIG. 2, in the form of a specified path through a decision tree, as one or more user-specified limitation on an attribute field, in another form, or any combination thereof. The constraints may be received at a computing system running instructions for an automatic test generation system. The constraints may be entered through a compiler interface.

The method 300 may include converting the constraints into valid syntax, at 304. For example, a compiler interface may receive the constraints in the form of natural language syntax in the form of natural English sentences, in the form of pseudo code, or in the form of compiler code or other computer-executable format. The interface or automatic test generation system may perform any necessary conversions to change the entered constraints into computer-executable form.

The method 300 may next include generating a data set based on the constraints, at 306. For example, the system may create a structured data set including numerous data fields, which data set can be consumed by a decision table-based rules engine to produce a result. Generating the data set may include populating data fields from collected data, for example from data stored in a database. The data sets may also be generated based on data generation rules, such as value limits and data types for various fields. For example, data generation rules may include a permissible value range for an integer attribute field, or correlations between attributes, such as limiting zip code values based on a "State" attribute. The data set may also be generated based on a rule set of a rules engine. For example, the test generation system may reference a set of decision points in a rule set, so that the data set may be generated to follow a specified decision path through the rule set. In some embodiments, the data set may also be generated based on results of a previous test of a rule set, so that particular decision points receive additional testing.

The method 300 may then provide the generated data set to the rules engine, at 308. The rules engine may produce a set of outputs based on the results of the data set being run through the rules engine. After receiving the results, the method 300 may include determining whether to modify the constraints based on the rules engine output, at 310. For example, if particular points in a decision tree or rule set are producing unexpected results, the constraints may be modified to focus on the decision points or rules in question.

If a decision is made to modify the constraints at 310, the constraints may be accordingly modified at 312. The modified constraints may be fed into the test generation system as inputs, and a new data set may be generated at 306. If a decision is made not to modify the constraints based on the rules engine output at 310, the method may end at 314.

In accordance with various embodiments, the methods described herein may be implemented as one or more software programs running on a computer processor or controller. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device, such as hardware components storing instructions that when executed cause a processor to perform the methods. Instructions for performing the methods disclosed herein may also be broadcast to a device for execution using computer readable transmission media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A memory device storing instructions that cause a processor to perform a method comprising:
    receiving one or more constraints for a set of data attributes;
    generating a structured data set of the data attributes having values based on the one or more constraints, including generating at least some of the data attributes of the structured data set using random values; and
    providing the structured data set to a decision table-based rule set.

2. The memory device of claim 1, the method further comprising:
    analyzing the decision table-based rule set to determine decision points where defined data attribute values cause a branching in the decision table-based rule set logic; and
    generating the structured data set based on the decision points.

3. The memory device of claim 1, the method further comprising:
    receiving an output result based on the structured data set from the decision table-based rule set; and
    generating a second structured data set based on the output result.

4. The memory device of claim 1, the method further comprising:
    receiving the one or more constraints at a compiler interface; and
    converting the one or more constraints into a specified computer-executable syntax.

5. The memory device of claim 1, the method further comprising:
generating the structured data set based on a set of data generation rules including valid value ranges for the data attributes.

6. The memory device of claim 1, the method further comprising:
generating the structured data set using one or more sets of collected data values.

7. The memory device of claim 1, the method further comprising:
generating the structured data set based on a user-specified path through the decision table-based rule set.

8. The memory device of claim 1, the method further comprising:
receiving user input to modify the structured data set.

9. The memory device of claim 1, the method further comprising:
receiving the one or more constraints in the form of a test generation specification which defines data structures for the set of data attributes and direction on how to populate the set of data attributes.

10. A method comprising:
automatically testing functionality, via a computer processor, of a decision table-based rule set configured to process data for a computing system, the testing including:
receiving, at the computer processor, one or more constraints indicating acceptable values for a set of data attributes;
converting the constraints into computer-executable syntax;
generating a structured data set of the data attributes having values based on the computer-executable syntax, at least some of the data attributes of the structured data set generated using random values;
providing, via the computer processor, the structured data set to the decision table-based rule set for processing in order to test the decision table-based rule set functionality with respect to the structured data set; and
providing, via the computer processor, a result output from the test.

11. The method of claim 10 further comprising:
analyzing the decision table-based rule set to determine decision points where defined data attribute values cause a branching in the decision table-based rule set logic; and
generating the structured data set based on the decision points.

12. The method of claim 10, further comprising:
receiving the one or more constraints at a compiler interface; and
converting the one or more constraints into a specified computer-executable syntax.

13. The method of claim 10, further comprising:
generating the structured data set based on a user-specified path through the decision table-based rule set.

14. An apparatus comprising:
a controller configured to:
receive one or more constraints defining permissible values for a set of data attributes, the constraints based on decision points of a decision table-based rule set where defined data attribute values cause a branching in the decision table-based rule set logic;
generate a structured data set of the data attributes having values based on the one or more constraints;
test functionality of the decision table-based rule set by providing the structured data set to the decision table-based rule set to trigger selected branching decision points; and
analyze an output result produced by the decision table-based rule set in response to the structured data set to determine the functionality.

15. The apparatus of claim 14, the controller further configured to:
analyze the decision table-based rule set to determine the decision points; and
generate the structured data set based on the decision points.

16. The apparatus of claim 14, the controller further configured to:
generate a second structured data set based on the output result.

17. The apparatus of claim 14, the controller further configured to:
receive the one or more constraints at a compiler interface; and
convert the one or more constraints into a specified computer-executable syntax.

18. The apparatus of claim 14, the controller further configured to:
generate the structured data set based on a user-specified path through the decision table-based rule set.

19. The apparatus of claim 14, the controller further configured to:
generate the structured data set using random values.

* * * * *